(12) United States Patent
Irazabal et al.

(10) Patent No.: US 11,188,920 B2
(45) Date of Patent: Nov. 30, 2021

(54) AUTOCOMMIT TRANSACTION MANAGEMENT IN A BLOCKCHAIN NETWORK

(71) Applicant: International Business Machines Corporation, Armonk, NY (US)

(72) Inventors: Jeronimo Irazabal, Buenos Aires (AR); Andres Garagiola, Buenos Aires (AR); Diego A. Masini, La Plata (AR); Dulce B. Ponceleon, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 15/987,126

(22) Filed: May 23, 2018

(65) Prior Publication Data

US 2019/0362361 A1  Nov. 28, 2019

(51) Int. Cl.
*G06Q 20/42* (2012.01)
*H04L 9/06* (2006.01)

(52) U.S. Cl.
CPC .......... *G06Q 20/42* (2013.01); *H04L 9/0637* (2013.01)

(58) Field of Classification Search
CPC ... G06Q 20/42; H04L 9/0637; H04L 63/0428; H04L 67/1097; H04L 2209/38; H04L 63/12; G06F 21/602; G06F 2221/033
See application file for complete search history.

(56) References Cited

U.S. PATENT DOCUMENTS

| | | |
|---|---|---|
| 9,608,829 B2 | 3/2017 | Spanos et al. |
| 2016/0292672 A1 | 10/2016 | Fay et al. |
| 2017/0075941 A1 | 3/2017 | Finlow-Bates |
| 2017/0091750 A1 | 3/2017 | Maim |
| 2017/0103468 A1 | 4/2017 | Orsini et al. |
| 2017/0132626 A1 | 5/2017 | Kennedy |

(Continued)

FOREIGN PATENT DOCUMENTS

| | | | | |
|---|---|---|---|---|
| WO | WO-2012068159 A1 * | 5/2012 | ............ | H04L 69/08 |
| WO | 2017036546 A1 | 3/2017 | | |

(Continued)

OTHER PUBLICATIONS

Ramesh "Rameshthoomu" Babu. fabricdocs Documentation Release 1.0, Feb. 15, 2017 [Retrieved on Jan. 24, 2020]. Retrieved from the Internet: <URL:https://readthedocs.org/projects/fabrictestdocs/downloads/pdf/latest/> (Year: 2017).*

(Continued)

*Primary Examiner* — Bennett M Sigmond
*Assistant Examiner* — Bolko M Hamerski

(57) ABSTRACT

An example operation may include one or more of a method for providing a one-step transaction submission in a blockchain network, comprising sending a transaction proposal, by a client node, to one or more peers of a plurality of peers, simulating a transaction associated with the transaction proposal, by at least one peer of the plurality of peers, evaluating, by an endorser peer, whether an endorsement policy has been fulfilled, and when the endorsement policy has been fulfilled, sending the transaction to at least one orderer node to be committed to a ledger, by the endorser peer.

15 Claims, 7 Drawing Sheets

(56) References Cited

U.S. PATENT DOCUMENTS

| | | | |
|---|---|---|---|
| 2017/0236120 A1* | 8/2017 | Herlihy | G06F 21/57 705/67 |
| 2017/0250972 A1 | 8/2017 | Ronda et al. | |
| 2019/0013943 A1* | 1/2019 | Maim | G06F 21/51 |
| 2019/0104196 A1* | 4/2019 | Li | H04L 9/3239 |
| 2019/0229891 A1* | 7/2019 | Naqvi | H04L 9/0637 |
| 2019/0279241 A1* | 9/2019 | DiTomaso | H04L 9/3239 |
| 2019/0347658 A1* | 11/2019 | Haimes | G06Q 20/04 |
| 2020/0134613 A1* | 4/2020 | Jiang | G06F 16/1824 |

FOREIGN PATENT DOCUMENTS

| | | | | |
|---|---|---|---|---|
| WO | WO2019211494 A1 * | 11/2019 | | H04L 29/06 |
| WO | WO-2019211494 A1 * | 11/2019 | | H04L 9/3239 |

OTHER PUBLICATIONS

Gilad, Y., Hemo, R., Micali, S. M., Vlachos, G., Zeldovich, N.; Scaling Byzantine Agreements for Cryptocurrencies; Oct. 2017; SOSP '17: Proceedings of the 26th Symposium on Operating Systems Principles Oct. 2017 pp. 51-68 (Year: 2017).*

K. Cong, Z. Ren and J. Pouwelse, "A Blockchain Consensus Protocol With Horizontal Scalability," 2018 IFIP Networking Conference (IFIP Networking) and Workshops, 2018, pp. 1-9, doi: 10.23919/IFIPNetworking.2018.8696555. (Year: 2018).*

João Sousa and Alysson Bessani and Marko Vukolić. A Byzantine Fault-Tolerant Ordering Service for the Hyperledger Fabric Blockchain Platform. 2018 IFIP Networking Conference (IFIP Networking) and Workshops, 2018, pp. 1-9, doi: 10.23919/IFIPNetworking.2018.8696555. (Year: 2017).*

Anonymous, "A System and a Method for Meta-Trust Models and its Application to Meta-Validation of Blockchain." IP.com Disclosure No. IPCOM000248773D. Publication Date: Jan. 9, 2017.

Vukolic, "Rethinking Permissioned Blockchains." Proceeding BCC '17 Proceedings of the ACM Workshop on Blockchain, Cryptocurrencies and Contracts, pp. 3-7. Abu Dhabi, United Arab Emirates—Apr. 2-2, 2017.

C. Cachin, "Blockchain Consensus Protocols in the Wild." (Submitted on Jul. 6, 2017 (v1), last revised Jul. 7, 2017 (this version, v2)). https://arxiv.org/abs/1707.01873.

Hyperledger, "Gossip data dissemination protocol." Hyperledger 2017. Revision c7c88275. http://hyperledger-fabric.readthedocs.io/en/release/gossip.html.

Hyperledger, "IBM Blockchain Hyperledger Fabric V1.0 stack," https://console.bluemix.net/docs/services/blockchain/reference/v10_fabric.html#hyperledger-fabric.

J. Sousa, "A Byzantine Fault-Tolerant Ordering Service for the Hyperledger Fabric Blockchain Platform." (Submitted on Sep. 20, 2017) https://arxiv.org/abs/1709.06921.

M. Herlihy, "Enhancing Accountability and Trust in Distributed Ledgers." (Submitted on Jun. 23, 2016) https://arxiv.orglabs/1606.07490.

Anonymous, "Ledger", https://web.archive.org/web/20170731010523/http://hyperledger-fabric-docs.readthedocs.io:80/en.latest/ledger/html, downloaded Jan. 23, 2019.

Anonymous, "Transaction Flow", https://web.archive.org/web/20170731010523/http://hyperledger-fabric-docs.readthedocs.io:80/en.latest/ltxtflow.html, downloaded Jan. 23, 2019.

International Search Report and Written Opinion issued in the corresponding International Application No. PCT/EP2019/062143, dated Jun. 12, 2019.

Tackmann, "Secure Event Tickets on a Blockchain", IBM Research, Springer International Publishing AG 2017, pp. 437-444.

Vukolic, "Rethinking Permissioned Blockchains", BCC'17 Apr. 2, 2017, Abu Dhabi, United Arab Emirates, ACM ISBN 978-1-4503-4974-1/17/04, pp. 3-7.

* cited by examiner

AUTOCOMMIT TRANSACTION MANAGEMENT IN A BLOCKCHAIN NETWORK

TECHNICAL FIELD

This application generally relates to transaction management, and more particularly, to autocommit transaction management in a blockchain network.

BACKGROUND

The flow to submit a transaction in a blockchain network may involve several steps for the client, especially when the invoked smart-contract has an associated policy that must be fulfilled before being committed to the ledger. This is the case in Hyperledger® Fabric v1, where a client first needs to send a transaction proposal to one or multiple peers (peers are specified in the endorsing policy), collect the results, determine whether the endorsing policy has been satisfied, and then submit the transaction to one or multiple orderer nodes. While the provision of the client Software Development Kit (SDK) for a blockchain platform simplifies those tasks from the application code interacting with a blockchain network, the communication overhead and processing tasks are not avoidable. The situation becomes critical when communication and processing resources are limited (e.g., for Internet-of-Things (IoT) devices). Accordingly, an improved transaction management approach that overcomes these deficiencies may be beneficial.

SUMMARY

Certain embodiments of the present application may provide solutions to the problems and needs in the art that have not yet been fully identified, appreciated, or solved by conventional blockchain transaction management technologies. For example, some embodiments of the present application pertain to autocommit transaction management in a blockchain network.

One example embodiment may provide a method that includes a method for providing a one-step transaction submission in a blockchain network. The method may include one or more of sending a transaction proposal, by a client node, to one or more peers of a plurality of peers, simulating a transaction associated with the transaction proposal, by at least one peer of the plurality of peers, evaluating, by an endorser peer, whether an endorsement policy has been fulfilled, and when the endorsement policy has been fulfilled, sending the transaction to at least one orderer node to be committed to a ledger, by the endorser peer.

Another example embodiment may provide a system that includes a client node, a plurality of peers, and at least one endorser node. The client node is configured to send transaction proposals to one or more peers of the plurality of peers. The plurality of peers are configured to perform one or more of simulate a transaction associated with the transaction proposal, evaluate whether an endorsement policy has been fulfilled, and/or when the endorsement policy has been fulfilled, send the transaction to the at least one orderer node to be committed to a ledger.

A further example embodiment may provide a non-transitory computer readable medium having stored therein program instructions, that when executed by at least one processor, cause the processor to perform one or more of receive a transaction proposal from a client node, simulate a transaction associated with the transaction proposal, evaluate whether an endorsement policy has been fulfilled, and/or when the endorsement policy has been fulfilled, send the transaction to at least one orderer node to be committed to a ledger.

DETAILED DESCRIPTION

Figure 1:
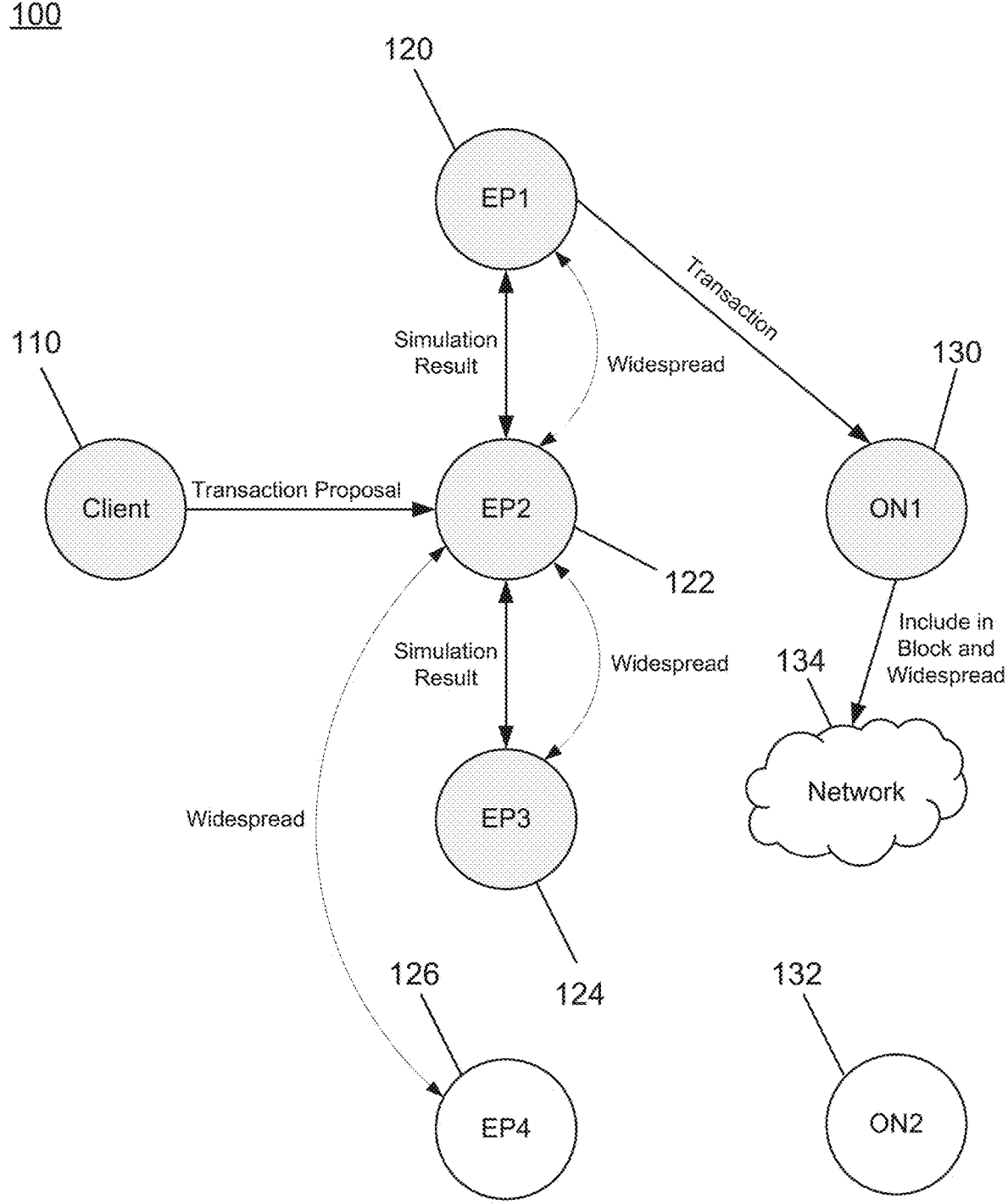
FIG. 1 illustrates a network diagram of a network of blockchain nodes implementing a schema, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, devices, networks and/or systems that provide autocommit transaction management in a blockchain network.

A blockchain is a distributed system that includes multiple nodes that communicate with each other. A blockchain operates programs called "chaincode" (e.g., smart contracts, etc.), holds state and ledger data, and executes transactions. Some transactions are operations invoked on the chaincode. In general, blockchain transactions typically must be "endorsed" by certain blockchain members and only endorsed transactions may be committed to the blockchain and have an effect on the state of the blockchain. Other transactions that are not endorsed are disregarded. There may exist one or more special chaincodes for management functions and parameters, collectively called "system chaincodes."

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node that submits a transaction-invocation to an endorser (e.g., a peer), and broadcasts transaction-proposals to an ordering service (e.g., an ordering node). Another type of node is a peer node that can receive client submitted transactions, commit the transactions, and maintain a state and a copy of the ledger of blockchain transactions. Peer nodes (or peers) can also have the role of an endorser, although this is not a requirement. An ordering-service-node, or orderer node, is a node running the communication service for all nodes. The orderer node implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) that is used to store an immutable, sequenced record in blocks. The ledger also includes a state database that maintains a current state of the blockchain. There is typically one ledger per channel. Each peer node maintains a copy of the ledger for each channel of which they are a member.

A distributed ledger is a ledger that is replicated in whole or in part to multiple computers. A Cryptographic Distributed Ledger (CDL) can have at least some of these properties: irreversibility (once a transaction is recorded, it cannot be reversed), accessibility (any party can access the CDL in whole or in part), chronological and time-stamped (all parties know when a transaction was added to the ledger), consensus based (a transaction is added only if it is approved, typically unanimously, by parties on the network), and/or verifiability (all transactions can be cryptographically verified). A blockchain is an example of a CDL. While the description and figures herein are described in terms of a blockchain, the subject application applies equally to any CDL.

A distributed ledger is a continuously growing list of records that typically apply cryptographic techniques such as storing cryptographic hashes relating to other blocks. A blockchain is one common instance of a distributed ledger and may be used as a public ledger to store information. Although, primarily used for financial transactions, a blockchain can store various information related to goods and services (i.e., products, packages, status, etc.). A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. Blockchain is a distributed database that maintains a continuously-growing list of records in the blockchain blocks, which are secured from tampering and revision due to their immutable properties. Each block contains a timestamp and a link to a previous block. Blockchain can be used to hold, track, transfer, and verify information. Since blockchain is a distributed system, before adding a transaction to the blockchain ledger, all peers typically need to reach a consensus status.

A chain is a transaction log that is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Whenever a transaction is committed into the ledger and the state is updated based on the transaction results, a timestamp is calculated for the updated keys based on the order in which such transaction was stored. If, however, the smart-contract involves more keys that are not modified in the current transaction, a modification is not made to those keys.

Some embodiments are tailored to provide a one-step transaction submission in a blockchain network where committed transactions had to fulfill a policy. Policies may determine the number of peers that have to agree on the transaction results, and/or specify which set of peers must agree. The approach of some embodiments is agnostic of the specific policy and just requires peers to communicate with each other and follow a fixed set of steps in order to process a transaction submission. This one-step approach is useful for IoT applications, as less computational resources and less stringent connectivity requirements are required on the client side. Indeed, some embodiments may be employed for applications including, but not limited to: (1) commercial/consumer application software, middleware, and operating systems; (2) methods, processes, and/or code associated with business process improvements; (3) social media and marketing; (4) hand-held devices; (5) health care applications; and/or (6) smarter planet and IoT.

In some embodiments, an alternative schema is employed that simplifies the client side while preserving the same security and privacy guarantees. In this new schema of some embodiments, clients submit a transaction request to one or more peers of the network. Peers follow a communication protocol to guarantee required peers and are able to obtain, process, and get processing results from other peers. Once a peer detects the policy has been fulfilled, the detecting peer can initiate the commit phase within the network. The new schema of some embodiments provides the advantages of the simplification of the client side, while still being able to get notified of the endorsing process, and providing of a protocol followed by endorsers tolerating byzantine behavior The underlying network may need to be enhanced in order to support the proposed transaction management schema in some embodiments. Peers that need to agree on a given transaction should be able to communicate with each other in order to determine when the associated policy has been fulfilled. The protocol that is followed should be fault tolerant to provide similar or identical security guarantees to the transaction flow in which the client is responsible for gathering results from the peers and determining when the policy has been fulfilled. Once one such peer detects that the policy was fulfilled, the detecting peer can initiate the steps required for the transaction to be committed into the ledger.

A "gossip-based" protocol may already be in use by the underlying blockchain platform. If that is the case, this communication mechanism could be used for the peers to distribute incoming transaction requests from clients and communicate transaction results between the peers that executed the transaction. Basically, a gossip protocol is an approach to agreement where there is a fixed group of participants. Periodically, each participant randomly selects a peer and exchanges state. This state is reconciled in a way so that all non-faulty participants eventually converge to the same state. It can be shown that this approach is efficient, converging in O(log N) gossip rounds, where N is the number of participants, even in the face of participants failures and message loss. Moreover, gossip protocols are amenable to open and dynamic membership where the membership itself is gossiped along with other state information.

The instant application in one embodiment relates to transaction management, and in another embodiment relates to autocommit transaction management in a blockchain network.

FIG. 1 illustrates a network diagram of a network 100 (e.g. a Hyperledger® Fabric v1 network) of blockchain nodes implementing a schema, according to example embodiments. As is typical of blockchain networks, network 100 includes a client node 110, multiple endorser peer nodes EP1 120, EP2 122, EP3 124, and EP4 126, and orderer nodes ON1 130 and ON2 132. Nodes involved in the transaction process in this embodiment are shown in gray (i.e., client node 110, EP1 120, EP2 122, EP3 124, and ON1 130) and nodes that are not involved are shown in white (i.e., EP4 126 and ON2 132).

Client node 110 first sends a transaction proposal to one or more peers (here, just to ON2 122). Peers EP1 120, EP2, 122, EP3 124, and EP4 126 widespread the transaction proposal using the underlying protocol (e.g., a gossip protocol). Only the widespreading arrows and simulation result arrows for EP2 122 are shown here in the interest of reducing complexity. The endorser peers simulate the transaction and communicate the simulation results so all endorsers associated with the given chaincode eventually receive the result. The endorser peers evaluate whether the endorsement policy has been fulfilled. Here, nodes EP1 120, EP2, 122, and EP3 124 must agree on the transaction result. EP1 120 determines that the endorsement policy has been fulfilled (i.e., that nodes EP1 120, EP2, 122, and EP3 124 agree) and sends the transaction to one or several orderer nodes (in this embodiment, only ON1 130). The choice might be random in order to support byzantine behavior by the orderers. After the transaction is sent for ordering (i.e., sent to the one or more orderer nodes), the transaction is included into a block and then widespread on the network 134 to nodes that simulated the transaction and nodes that only maintain a copy of the ledger. Any of the nodes depicted in FIG. 1, and possibly additional nodes that are not shown, may be included in the network 134 without deviating from the scope of the application.

In the new schema of some embodiments, the client sends a transaction to one or more peers, each endorser simulates the transaction as usual. However, instead of returning the endorsing result to the client, the endorsers communicate with each other to collect required endorsing signatures. Once accomplished, endorsers send the endorsed transaction to one or more orderers.

Endorsers involved in the endorsing process are determined by the endorsing policy. The blockchain platform might still support both the original transaction management mode and the new transaction management mode of some embodiments. Which mechanism is used for each transaction can be set globally, on each peer, or even on the transaction proposal itself in some embodiments.

Figure 2:
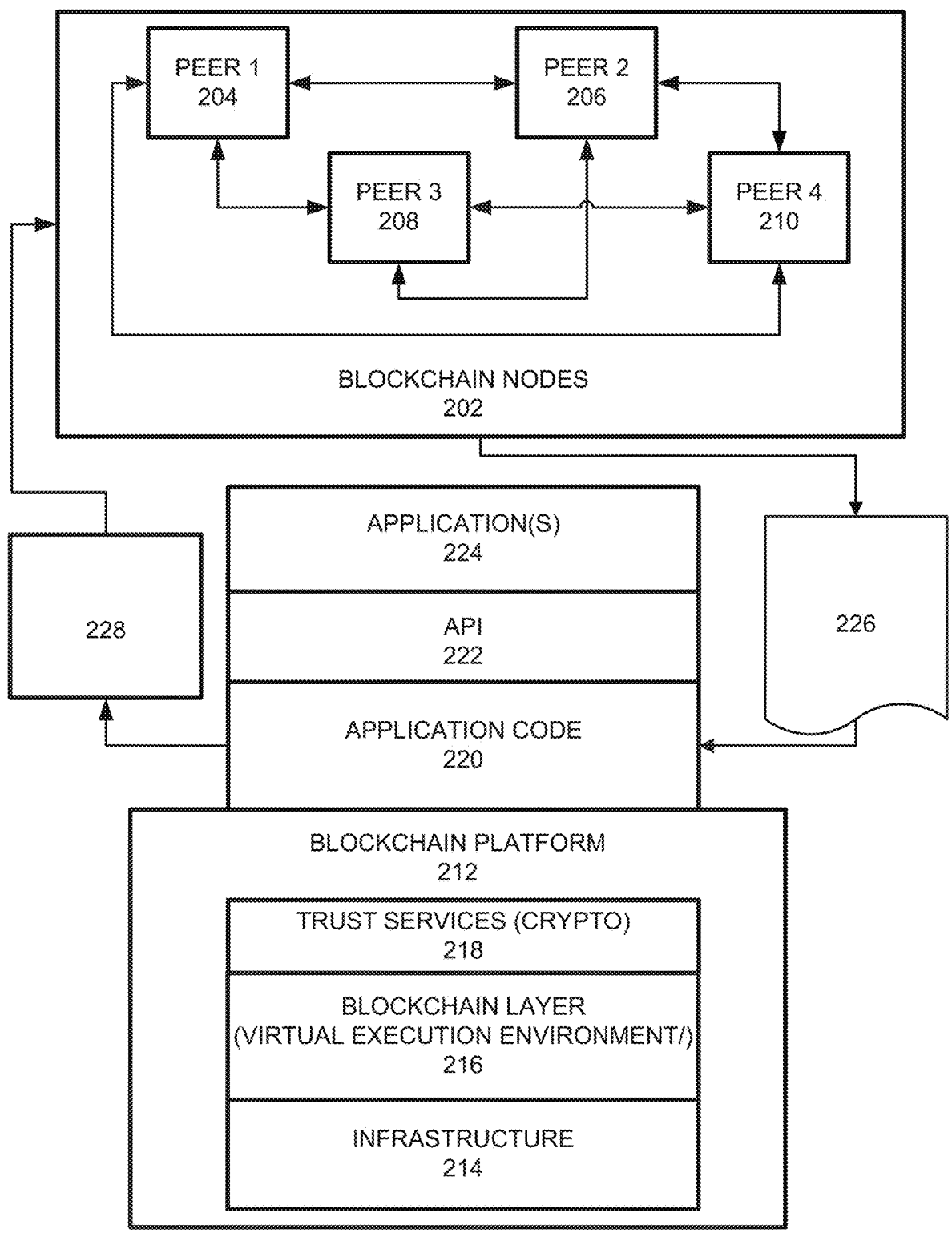
FIG. 2 illustrates an example peer node blockchain architecture configuration for an asset sharing scenario, according to example embodiments.

FIG. 2 illustrates a blockchain architecture configuration 200, according to example embodiments. The blockchain architecture 200 may include certain blockchain elements, for example, a group of blockchain nodes 202. The blockchain nodes 202 may include one or more nodes 204-210 (4 nodes are depicted here by example only). These nodes participate in a number of activities, such as blockchain transaction addition and the validation process (consensus). One or more of the blockchain nodes 204-210 may endorse transactions and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include applications 224, which are linked to application programming interfaces (APIs) 222 to access and execute stored program/application code 220 (e.g., chaincode, smart contracts, etc.) and can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2 may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, information 226 pertinent to providing a one-step transaction submission in a blockchain network where committed transactions had to fulfill a policy may be processed by one or more processing entities (e.g., virtual machines) included in the blockchain layer 216. The result 228 may include information indicating that a number of peers agree on the transaction results. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 3:
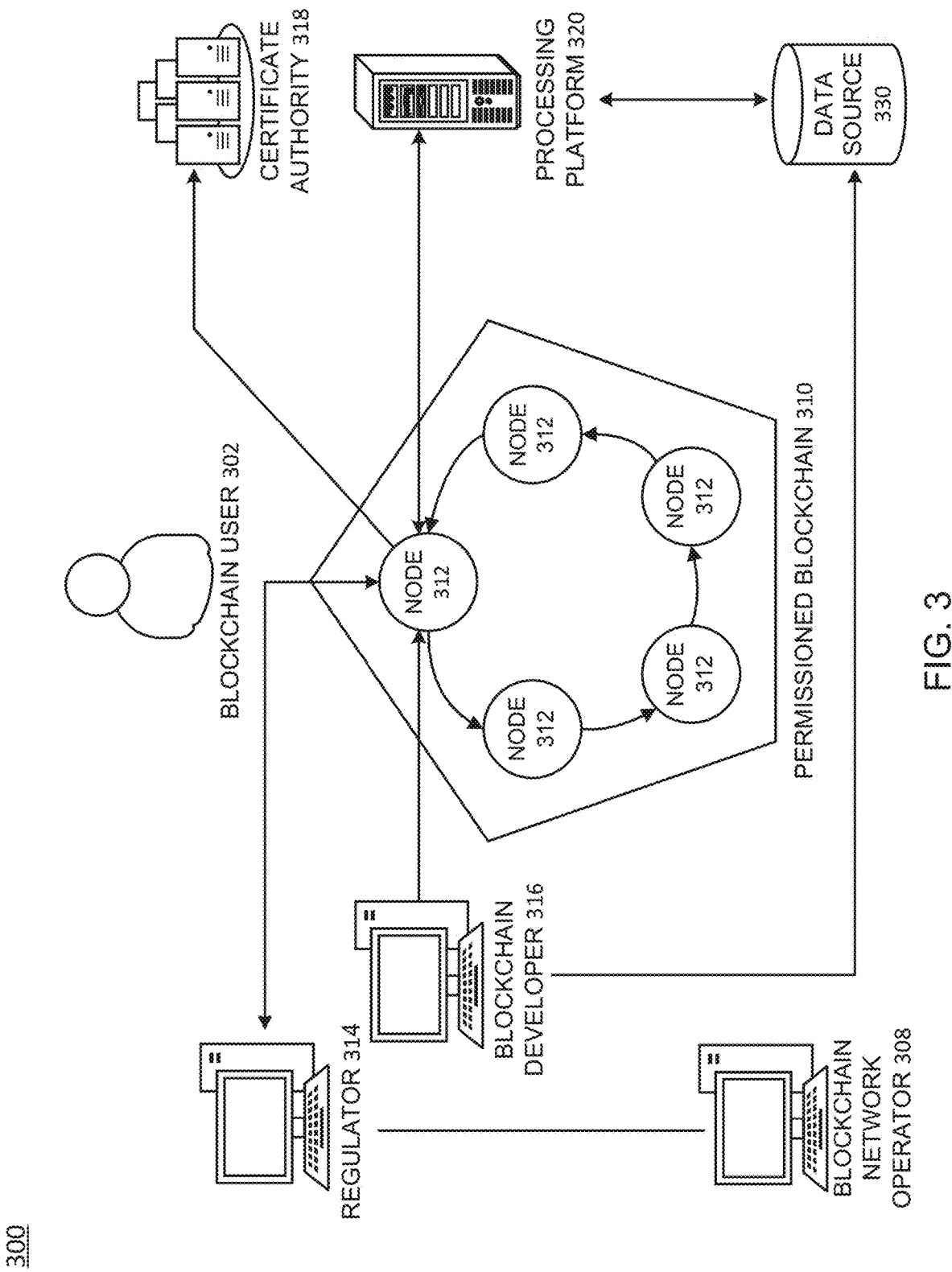
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
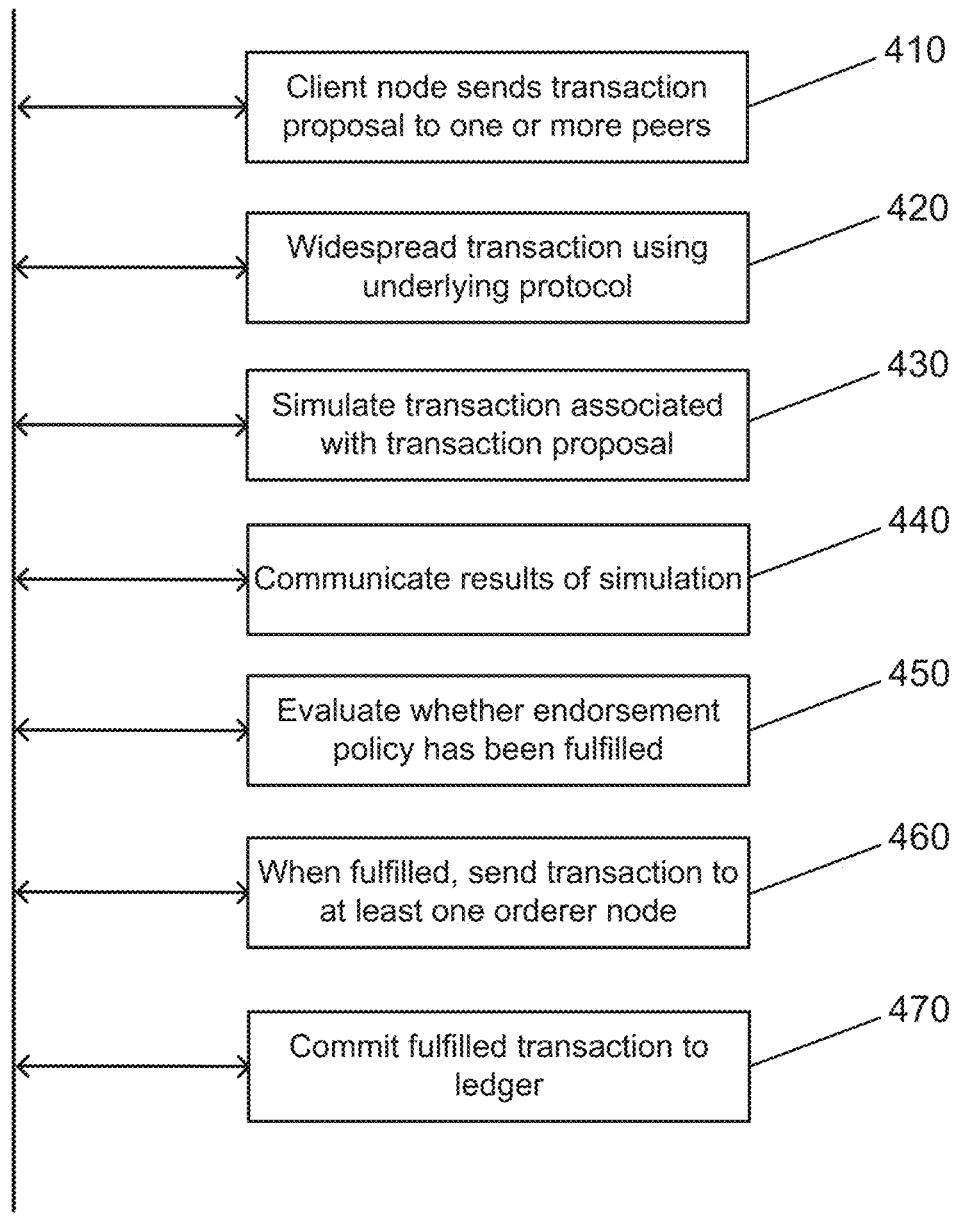
FIG. 4 illustrates a flow diagram of an example method of providing autocommit transaction management in a blockchain network.

FIG. 4 illustrates a flow diagram 400 of an example method of providing autocommit transaction management in a blockchain network. A client node sends a transaction proposal to one or more peers at 410. The transaction proposal is then widespread by the peers at 420 using an underlying protocol (e.g., a gossip protocol). At least some of the peers simulate a transaction associated with the transaction proposal at 430 and communicate results of the simulation to other peers at 440 so all endorsers associated with a given chaincode eventually receive the results. An endorser peer then evaluates whether an endorsement policy has been fulfilled at 450. When the endorsement policy has been fulfilled, the endorser peer sends the transaction to at least one orderer node at 460 to be committed to a ledger. One or more of the orderer nodes then commits the transaction to a ledger at 470. A difference between this one-step process and conventional processes is that the endorsing result is not sent to the client node.

In some embodiments, the transaction is randomly sent to the orderer nodes in order to support byzantine behavior by the orderer nodes. In certain embodiments, the blockchain network supports a plurality of transaction modes, and which transaction mode is used is set globally, on each peer, in the transaction proposal itself, or a combination thereof. In some embodiments, the endorsement policy determines a number of peers that must agree on transaction results, which set of peers must agree on the transaction results, or both. In certain embodiments, a transaction flow of the one-step transaction submission process is fault tolerant to provide similar or identical security guarantees to a transaction flow in which the client is responsible for gathering results from the peers and determining when the policy has been fulfilled.

Figure 5A:
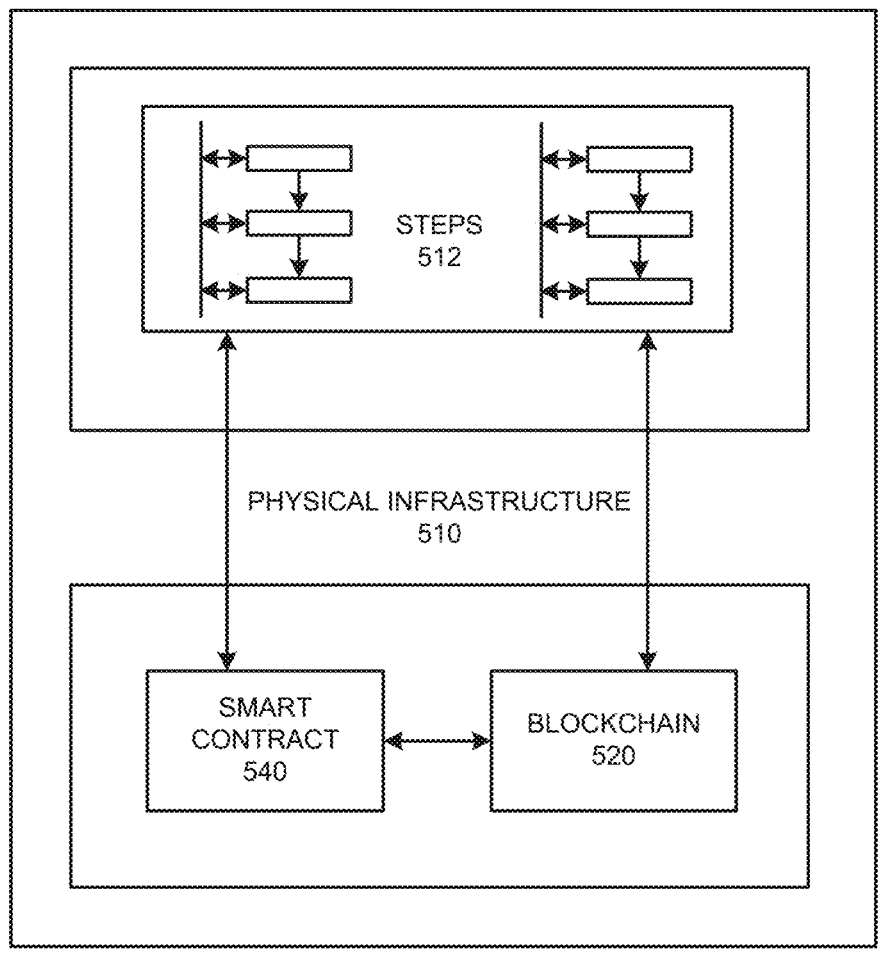
FIG. 5A illustrates an example physical infrastructure configured to perform various operations on the blockchain in accordance with one or more operations described herein, according to example embodiments.

FIG. 5A illustrates an example physical infrastructure configured to perform various operations on the blockchain in accordance with one or more of the example methods of operation according to example embodiments. Referring to FIG. 5A, the example configuration 500 includes a physical infrastructure 510 with a blockchain 520 and a smart contract 540, which may execute any of the operational steps 512 included in any of the example embodiments. The steps/operations 512 may include one or more of the steps described or depicted in one or more flow diagrams and/or logic diagrams. The steps may represent output or written information that is written or read from one or more smart contracts 540 and/or blockchains 520 that reside on the physical infrastructure 510 of a computer system configuration. The data can be output from an executed smart contract 540 and/or blockchain 520. The physical infrastructure 510 may include one or more computers, servers, processors, memories, and/or wireless communication devices.

Figure 5B:
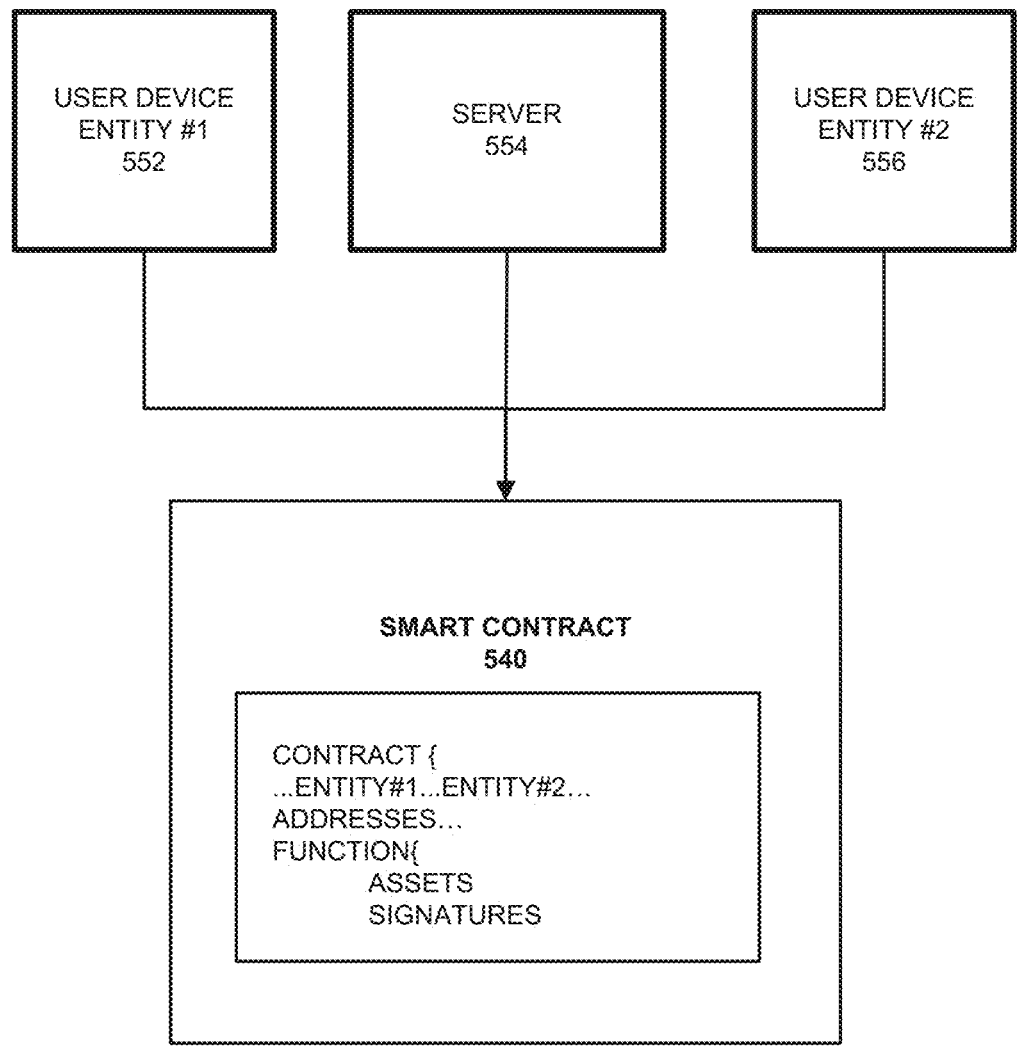
FIG. 5B illustrates an example smart contract configuration among contracting parties and a mediating server configured to enforce smart contract terms on a blockchain, according to example embodiments.

FIG. 5B illustrates an example smart contract configuration among contracting parties and a mediating server configured to enforce the smart contract terms on the blockchain according to example embodiments. Referring to FIG. 5B, the configuration 550 may represent a communication session, an asset transfer session or a process or procedure that is driven by a smart contract 540 which explicitly identifies one or more user devices 552 and/or 556. The execution, operations and results of the smart contract execution may be managed by a server 554. Content of the smart contract 540 may require digital signatures by one or more of the entities 552 and 556 which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example computer system architecture 600, which may represent or be integrated in any of the above-described components, etc.

Figure 6:
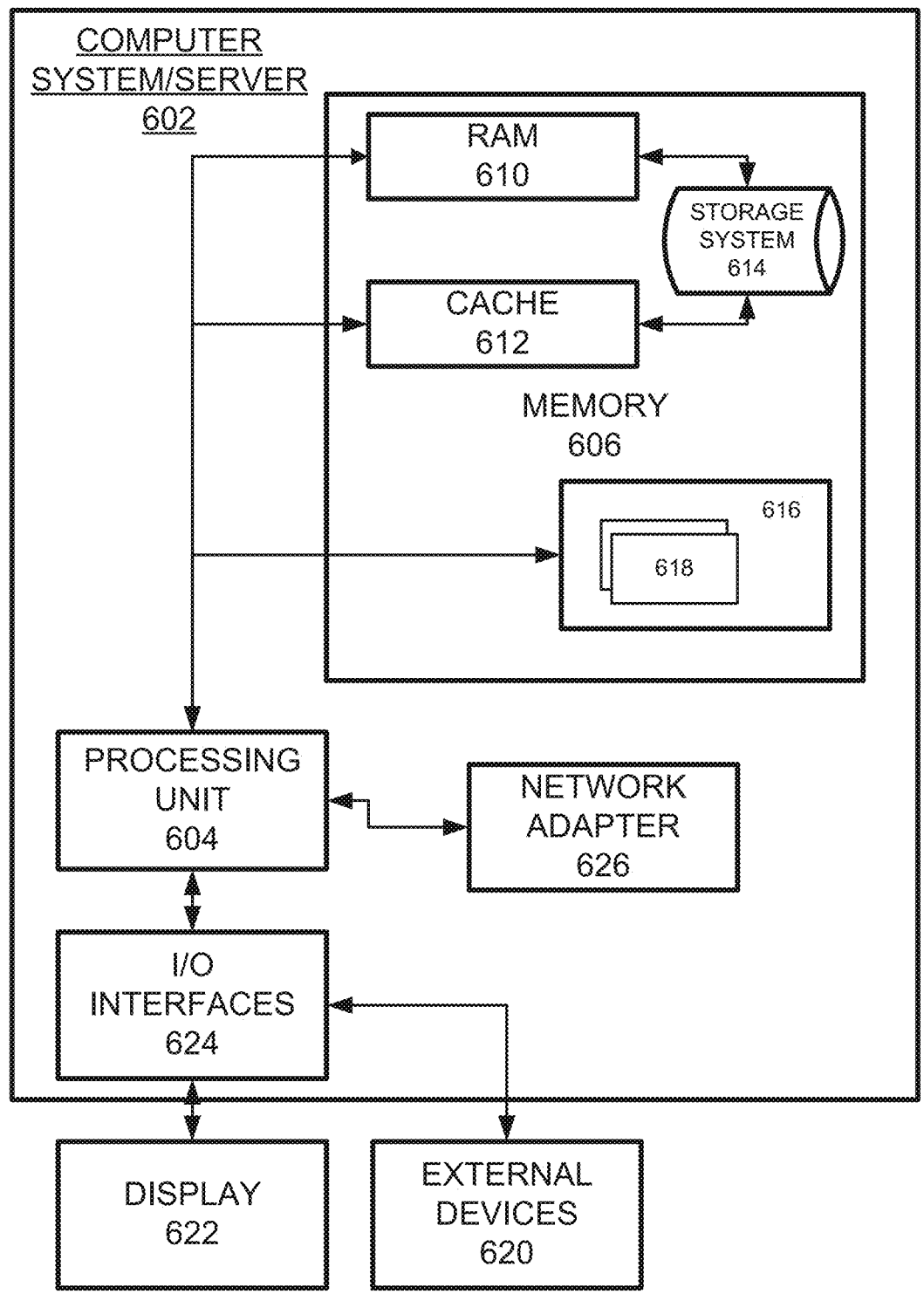
FIG. 6 illustrates an example computer system configured to support one or more of the example embodiments.

FIG. 6 is not intended to suggest any limitation as to the scope of use or functionality of embodiments of the application described herein. Regardless, the computing node 600 is capable of being implemented and/or performing any of the functionality set forth hereinabove.

In computing node 600 there is a computer system/server 602, which is operational with numerous other general purpose or special purpose computing system environments or configurations. Examples of well-known computing systems, environments, and/or configurations that may be suitable for use with computer system/server 602 include, but are not limited to, IoT devices, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 602 in cloud computing node 600 is shown in the form of a general-purpose computing device. The components of computer system/server 602 may include, but are not limited to, one or more processors or processing units 604, a system memory 606, and a bus that couples various system components including system memory 606 to processor 604.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media. System memory 606, in one embodiment, implements the flow diagrams of the other figures. The system memory 606 can include computer system readable media in the form of volatile memory, such as random-access memory (RAM) 610 and/or cache memory 612. Computer system/server 602 may further include other removable/non-removable, volatile/non-volatile computer system storage media. By way of example only, storage system 614 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 606 may include at least one program product having a set (e.g., at least one) of program modules that are configured to carry out the functions of various embodiments of the application.

Program/utility 616, having a set (at least one) of program modules 618, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules 618 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 602 may also communicate with one or more external devices 620 such as a keyboard, a pointing device, a display 622, etc.; one or more devices that enable a user to interact with computer system/server 602; and/or any devices (e.g., network card, modem, etc.) that enable computer system/server 602 to communicate with one or more other computing devices. Such communication can occur via I/O interfaces 624. Still yet, computer system/server 602 can communicate with one or more networks such as a local area network (LAN), a general wide area network (WAN), and/or a public network (e.g., the Internet) via network adapter 626. As depicted, network adapter 626 communicates with the other components of computer system/server 602 via a bus. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via one or more of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method for providing a one-step transaction submission in a blockchain network, comprising:
receiving, by one or more peers, of a plurality of peers in the blockchain network, a transaction proposal from a client node;
simulating, by at least one endorser peer, of the plurality of peers, a transaction associated with the transaction proposal to generate a simulation result based on a chaincode associated with the blockchain network;
communicating, by the at least one endorser peer, the simulation result to other endorser peers, of the plurality of peers, associated with the chaincode;
identifying, by an endorser peer, of the at least one endorser peer, that the simulation result satisfies an endorsement policy specified by the chaincode; and
sending, by the endorser peer, the transaction to at least one orderer node to be committed to a ledger when the endorsement policy is satisfied, wherein the endorser peer never sends an endorsing result to the client node.

2. The method of claim 1, further comprising:
widespreading, by the plurality of peers, the transaction proposal using an underlying protocol.

3. The method of claim 2, wherein the underlying protocol is a gossip protocol.

4. The method of claim 1, wherein the sending the transaction to the at least one orderer node further comprises:
randomly sending the transaction to support byzantine behavior by the at least one orderer node.

5. The method of claim 1, wherein the blockchain network supports a plurality of transaction modes, and which transaction mode is used is set globally, on each peer, in the transaction proposal itself, or a combination thereof.

6. The method of claim 1, wherein the endorsement policy determines a number of peers that must agree on transaction results, which set of peers must agree on the transaction results, or both.

7. The method of claim 1, wherein a transaction flow of the one-step transaction submission process is fault tolerant.

8. A hardware-implemented system in a blockchain network, the hardware-implemented system comprising:
a client node including a processor and a memory;
a plurality of peers, each including a processor and a memory; and
at least one endorser node, including a processor and a memory, in the plurality of peers, wherein
the client node is configured to send transaction proposals to one or more peers, of the plurality of peers, and the at least one endorser node is configured to:
simulate a transaction associated with the transaction proposal to generate a simulation result based on a chaincode associated with the blockchain network,
identify that the simulation result satisfies an endorsement policy specified by the chaincode, and
send the transaction to the at least one orderer node to be committed to a ledger when the endorsement policy is satisfied, wherein the endorser peer never sends an endorsing result to the client node.

9. The hardware-implemented system of claim 8, wherein the plurality of peers are further configured to widespread the transaction proposal using a gossip protocol.

10. The hardware-implemented system of claim 8, wherein, when the at least one endorser node is to send the transaction, the at least one endorser node is further configured to:
randomly send the transaction to support byzantine behavior by the at least one orderer node.

11. The hardware-implemented system of claim 8, wherein the system supports a plurality of transaction modes, and which transaction mode is used is set globally, on each peer, in the transaction proposal itself, or a combination thereof.

12. The hardware-implemented system of claim 8, wherein the endorsement policy determines a number of peers that must agree on transaction results, which set of peers must agree on the transaction results, or both.

13. A non-transitory computer readable medium configured to store one or more instructions that when executed by at least one processor, of at least one endorser node on a blockchain network, causes the at least one processor to:
receive a transaction proposal from a client node on the blockchain network;
simulate a transaction associated with the transaction proposal to generate a simulation result based on a chaincode associated with the blockchain network;
identify that the simulation result satisfies an endorsement policy specified by the chaincode; and
send the transaction to at least one orderer node to be committed to a ledger when the endorsement policy is satisfied, wherein the endorser peer never sends an endorsing result to the client node.

14. The non-transitory computer readable medium of claim 13, wherein the one or more instructions are further configured to cause the at least one processor to:
widespread the transaction proposal using a gossip protocol.

15. The non-transitory computer readable medium of claim 13, wherein the endorsement policy determines a number of peers that must agree on transaction results, which set of peers must agree on the transaction results, or both.

* * * * *